Oct. 17, 1967     D. A. ARONES     3,346,896
CARPET AND FLOOR-SCRUBBING MACHINE
Filed Oct. 22, 1965     6 Sheets-Sheet 1

INVENTOR.
DANIEL A. ARONES
BY
Caswell, Logaard & Wickes
ATTORNEYS

INVENTOR.
DANIEL A. ARONES
BY
Caswell, Legaard & Wicks
ATTORNEYS

Oct. 17, 1967     D. A. ARONES     3,346,896
CARPET AND FLOOR-SCRUBBING MACHINE
Filed Oct. 22, 1965     6 Sheets-Sheet 4

INVENTOR.
DANIEL A. ARONES
BY
Caswell, Lagaard & Wicks
ATTORNEYS

United States Patent Office 3,346,896
Patented Oct. 17, 1967

3,346,896
CARPET AND FLOOR-SCRUBBING MACHINE
Daniel A. Arones, Wayzata, Minn., assignor to Advance Machine Company, Spring Park, Minn.
Filed Oct. 22, 1965, Ser. No. 501,154
10 Claims. (Cl. 15—50)

The invention relates to an improvement in a machine for scrubbing carpets and floors, the machine employing a brush and a foaming cleaning agent.

It is an object of the invention to provide a carpet and floor scrubbing machine having handle means, which when released to a vertical position for storage raises the brush to a position raised from the floor to allow ease of movement of the machine and also prevent deformation of the bristles of the brush if the same is allowed to rest on the floor.

It is also an object of the invention to provide a carpet and floor scrubbing machine having a new and novel construction for adjusting the position of the front wheels relative to the machine to accommodate the material being scrubbed.

It is still a further object to provide a carpet scrubbing machine having a single cylindrical brush which simultaneously propels the machine and cleans a carpet in both a forward and a rearward direction. By going over the carpet pile in both directions a greater area of each pile fiber is cleaned.

It will not be here attempted to set forth and indicate all of the various objects and advantages incident to the invention, but other objects and advantages will be referred to, or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1a is fragmentary rear view in elevation as seen generally from the line 1a—1a of FIGURE 3.

Referring to the drawings in detail, the device A includes the frame housing 24 which includes the continuous main bottom portion 26 formed with the transverse recess 28, the inner surface of which forms a motor support 25. The recess 28 terminates at its forward edge in the transverse rear wall 30 of the brush housing 32 and at its rear edge in the spaced pockets 27 and 29, the pocket 27 having the sidewalls 27' and the arcuate top wall 27''. The pocket 29 is formed with the sidewall 29' and the arcuate top wall 29''. The wall 30 terminates at one end in the first end wall 34 and at the other end in the second end wall formed of the spaced portions 36 and 38, the wall portion 36 connected to the end wall 34 by the transverse front wall 40 of the brush housing 32. Connected at its forward end to the transverse wall 30 at a point inwardly of wall 30 is the first sidewall 42 and extending from the rear end of the first sidewall 42 is the frame housing rear wall 44 which is connected to the second sidewall 46 connected to the transverse front wall 40. Extending from the top edge of the front wall 40 to the top edge of the rear wall 30 is the arcuate top 47 which completes the brush housing 32.

The extension of the brush housing rear wall 30, and the front wall 40 outwardly of the first sidewall 42 together with the first end wall 34 forms the brush housing offset portion 48. Extending rearwardly from the main housing rear wall 44 are a pair of spaced wheel housing supports 50 and 52 which are of an inverted U-shaped formation open at the rear end and bottom. The support 50 includes the spaced sidewalls 54 and 56 connected by the top portion 58, and the fixed rear ground-engaging wheel 60 is mounted between the walls 54 and 56 by means of the axle 62. The support 52 includes the spaced sidewalls 64 and 66 connected by the top portion 68, and the fixed rear wheel 70 is mounted between the walls 64 and 66 by means of the axle 72.

Further provided is the rotatable wheel-supporting shaft 74 which extend transversely of the housing 24 and is mounted on one end in the first sidewall 42 and at the other end on the sidewall 27'. The shaft 74 is mounted intermediate its ends in the sidewall 29' of the pocket 29 and both of the sidewalls 27' of the pocket 27. Thus the shaft 74 overlies the top surface of the bottom 26 and extends through the pockets 27 and 29.

Secured to the shaft 74 by means of the pins 76 is the sleeve 78 which extends between the sidewalls 27' and 29' of the pockets 27 and 29, respectively. The numeral 80 designates the cam arm formed of the spaced side members 82 and 84 connected at the inner ends to the sleeve 78 and which are formed with the transverse companion holes 86 and 88, respectively. Further provided is the cam bar 90 formed of the straight front portion 92 which terminates in the arcuate downwardly depending rear cam portion 94. The front end of the cam bar is formed with the pivot hole 95. The outer end of the cam portion 94 of bar 90 is connected to the inverted U-shaped bracket 96 which has the bottom 97 thereof formed with the slot 98. Secured to the outer free end of the arm 80 is the inverted U-shaped bracket 100 formed of the side portions 102 and 104 secured to the arm portions 82 and 84 respectively, with the bottom portion 106 formed with the hole 108.

The cam bar 90 is mounted on the cam arm 80 by means of the pin 110 which extends through the holes 86 and 88 of the arm 80 and the hole 95 of the cam bar 90. Interposed between the bottom 97 of the bracket 96 and the bottom portion 106 of the bracket 100 is the coil spring 112 which is maintained in such position by means of the bolt 114 extended through brackets 96 and 100 and secured by the nut 116 upon the bracket 100. As a result of the above, the cam bar 90 is resiliently mounted on the cam arm 80, the resiliency or "give" adjustable by means of the nut 116. With the resiliently mounted cam bar 90, the same acts as a shock absorber for the parts, for example, if the machine is dropped, tipped forward suddenly, or stepped on. The cam arm 80 pivots with the wheel supporting shaft 74 above the housing bottom 26.

Figure 13:
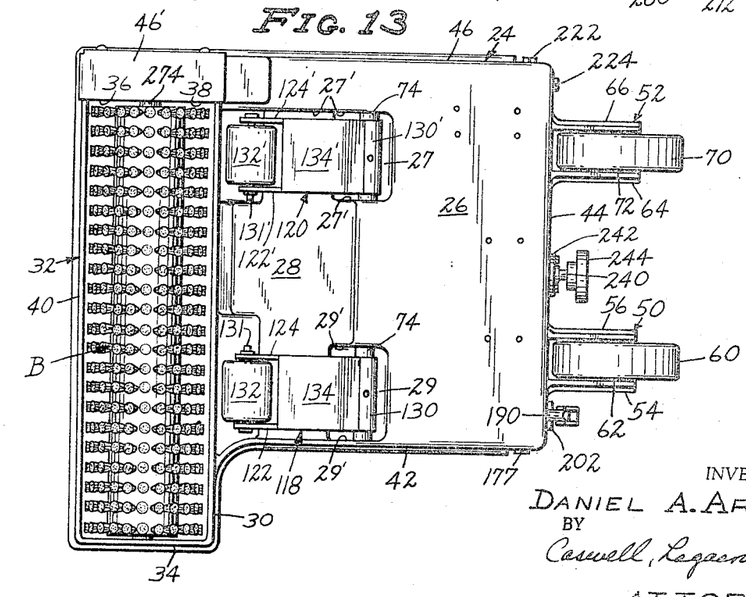
FIGURE 13 is a bottom plan view of the device.

Further provided are a pair of front wheel mount brackets 118 and 120, particularly FIGURES 13 and 14, which are identical, and therefore only mount bracket 118 will be described in detail, the corresponding parts of bracket 120 bearing the same numbers but with a prime (′) added. The wheel mount bracket 118 includes the arms 122 and 124 each formed of the straight portion 126 and the angularly disposed portion 128. The inner ends of the arms 122 and 124 are secured to the wheel bracket sleeve 130. The bracket 118 and sleeve 130 together with cam arm 80 provides a wheel-mounting rocker arm pivoted on shaft 74. Rotatably mounted between the outer ends of the arms 122 and 124 by means of shaft 131 is the front ground-engaging wheel 132. The arms 122 and 124 are held in rigid alignment by the connecting plate 134. The wheel bracket sleeve 130 is secured on the shaft 74 where the shaft extends from side wall 29′ to wall 42 through the pocket 29 thus pivotally mounting the front wheel 132 beneath the housing bottom portion 26 on the shaft 74. As the wheel 132 pivots so does the cam arm 82, for both are connected to the shaft 74.

As part of the mechanism for actuating the cam arm 80 to raise and lower the wheels 132 and 132′ there is included the rear main transverse shaft 136 rotatably mounted in the bearings 138 and 140 secured on the bottom 26, particularly FIGURES 2, 4, 5, 6, 7 and 10. Secured on the shaft 136 by means of the pin 142 is the sleeve 144 and secured at its inner end to the sleeve 144 and extending radially therefrom is the arm 146 bifurcated at 148 at the outer end thereof. A cam-actuating wheel 150 is pivotally mounted on the bifurcated end 148 of arm 146 and generally in alignment with the cam bar 90. Rotatable on the shaft 136 is the short sleeve 152, particularly FIGURES 6 and 7, the sleeve formed with the slot 154, and operative in the slot 154 is the pin 156 secured to the shaft 135. Thus the relative movement between short sleeve 152 and shaft 136 is limited by the length of the slot 154. As the upper edge of the slot 154 is caused to bear against pin 156 at $x$ upon the rotation of short sleeve 152, by the parts hereinafter described, the shaft 136 is thereby rotated clockwise as in FIGURES 6 and 7 thus causing arm 146, later described, to raise and thereby raise cam arm 80 to lower the wheels 132 and 132′. The weight of the machine upon the wheels 132 and 132′ maintains the cam bar 90 in pressing engagement downwardly upon the cam wheel 150 of arm 146.

Secured to the short sleeve 152 is the angle 154′ formed with base leg 156′ and the right angle leg 158. The outer end of the angle leg 158 is pivotally connected to and between the lower ends of the pair of links 160 and 162 by means of the pin 164, and pivotally connected at its lower end to and between the upper ends of the links 160 and 162 is the arm 166 by means of pin 167. The upper end of the arm 166 is fixed to the pivot stub shaft 168, the stub shaft rotatably mounted in the arms 170 and 172 of the bracket 173 the arms connected by the bracket base portion 174. The bracket base portion 174 is secured to the angle member 176 secured to the rear wall 44 and side wall 42 by bolts 177. Thus the member 176 mounts the bracket 173.

Figures 1, 2, 17:
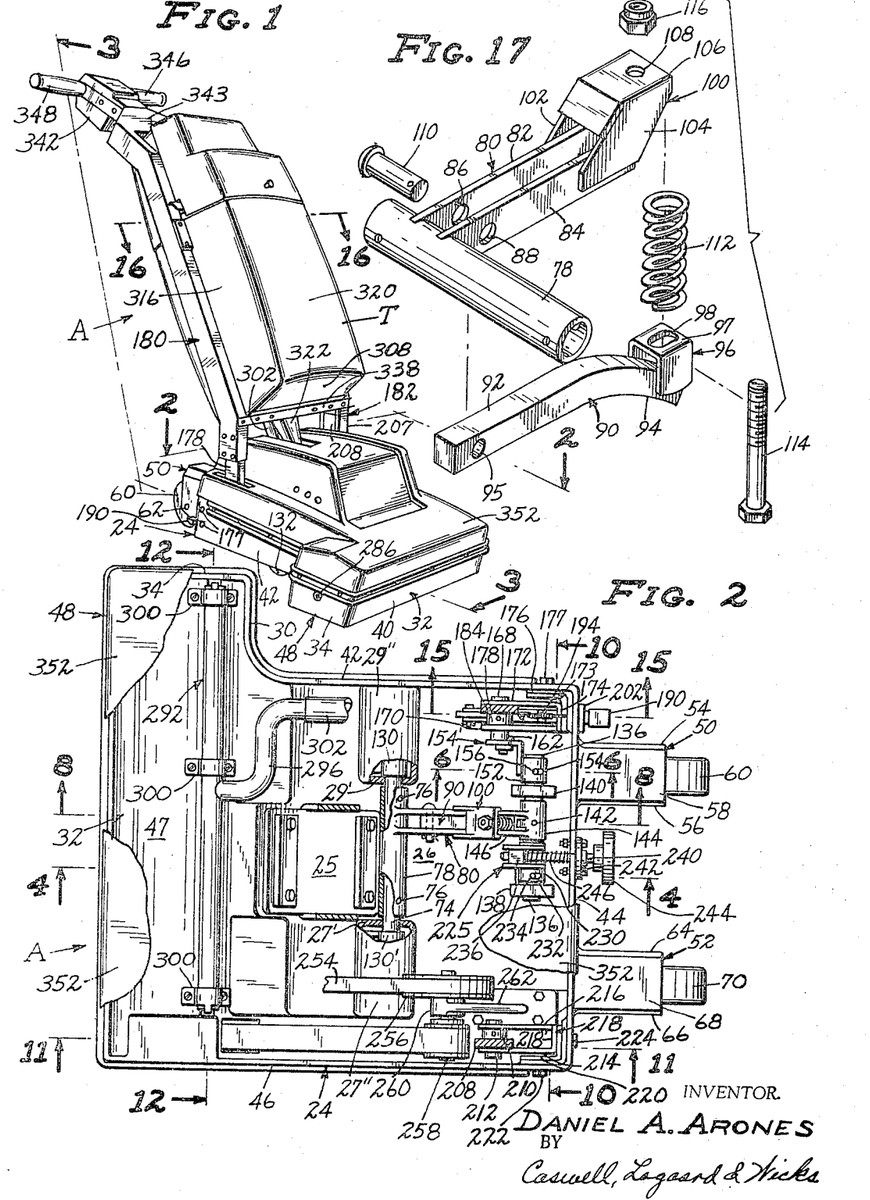
FIGURE 1 is a perspective view of the carpet cleaning device.
FIGURE 2 is a top plan view of the device generally on the line 2—2 of FIGURE 1 portions thereof broken away and shown in section.
FIGURE 17 is an exploded perspective view of the cam lever for raising and lowering the front wheels removed from the device.
Figure 10:
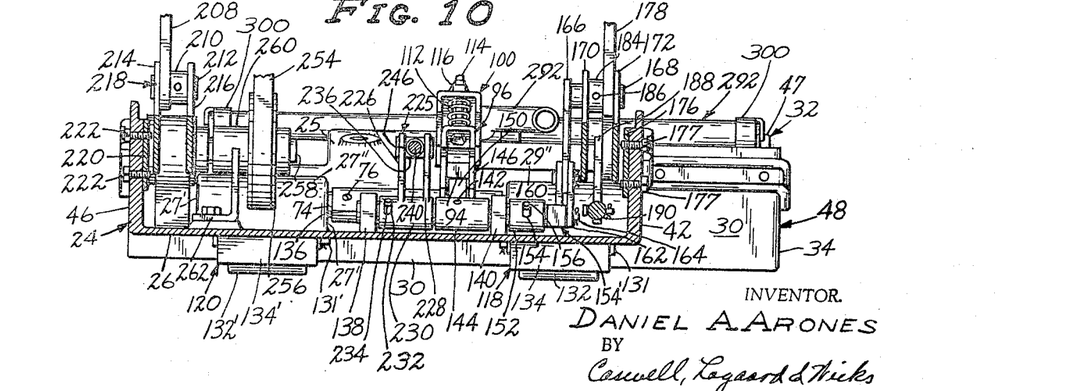
FIGURE 10 is a sectional view on the line 10—10 of FIGURE 2 with the device in the down position.

The numeral 178 designates the lower portion of the first of a pair of handle arms 180 and 182, and the arm portion 178 has extending therethrough at a point spaced from the lower end the stub shaft 168, FIGURES 2 and 10. Secured to and extending from the inside of the arm portion 178 is the collar 184 which is secured on the stub shaft 168 by means of the screw 186. Thus, the pivoted movement of the lower arm portion 178 rotates the stub shaft 168 which moves the arm 166 which actuates links 160 and 162 and bracket 154 rotating sleeve 152 clockwise to cause the edge of slot 154 to bear against pin 156 and thereby rotate shaft 136 which causes arm 146 to pivot upwardly and raise cam arm 80 to lower wheels 132 and 132′, FIGURES 6, 7, and 10.

Figures 3, 14, 15, 16:
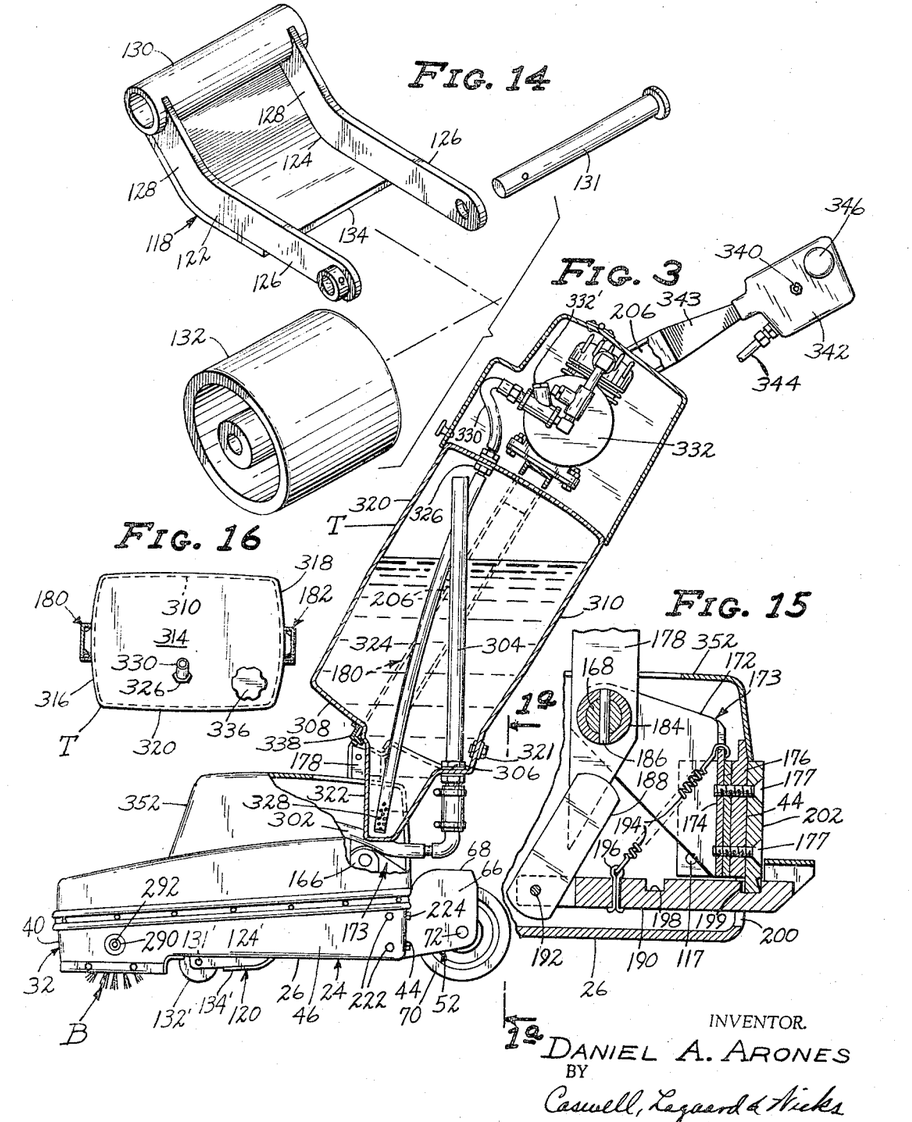
FIGURE 3 is a longitudinal sectional view generally on the line 3—3 of FIGURE 1.
FIGURE 14 is an exploded perspective view of one of the front wheels and arm therefor removed from the device.
FIGURE 15 is a sectional view on the line 15—15 of FIGURE 2 showing the handle locked in a position with the brush in a lowered position for use.
FIGURE 16 is a sectional view on the line 16—16 of FIGURE 1.
Figures 5, 6, 7:
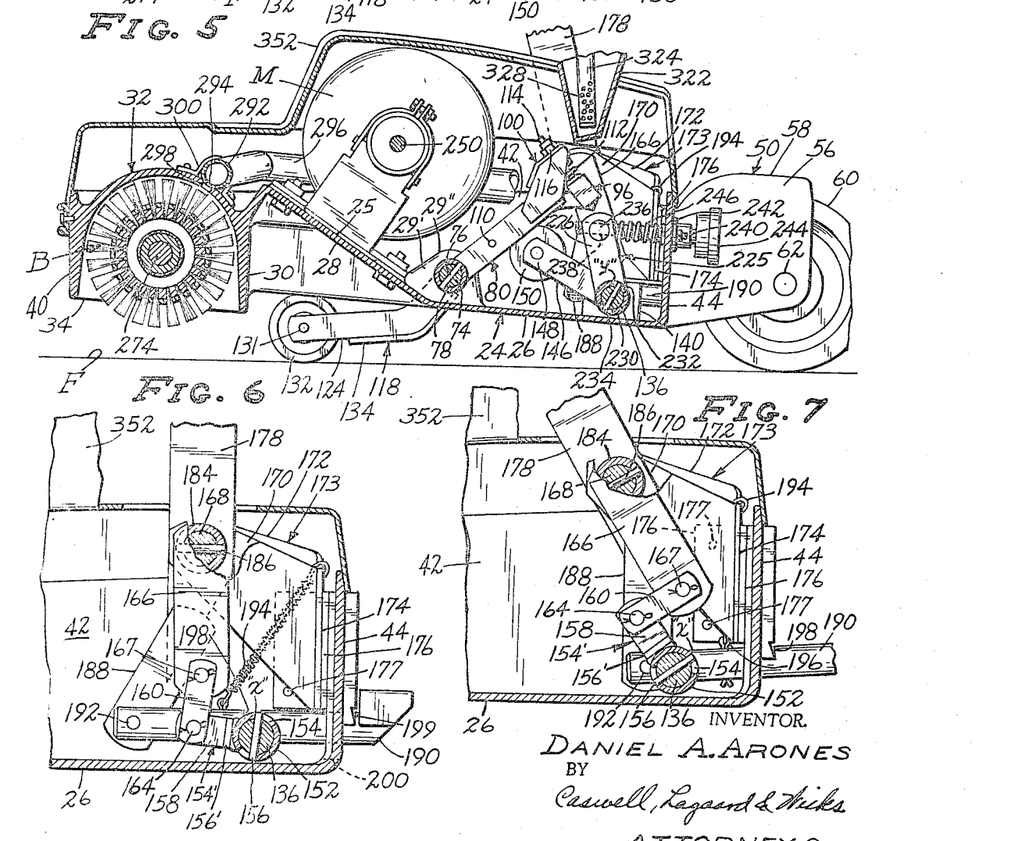
FIGURE 5 is a view similar to FIGURE 4 with the device shown in the raised position.
FIGURE 6 is a sectional view on the line 6—6 of FIGURE 2 in the raised position.
FIGURE 7 is a view similar to FIGURE 6 in the down position.

The lower end of the lower arm portion 178 has secured thereto the angularly disposed short end portion 188, FIGURES 6, 7, and 15, actually forming part of the handle arm portion 178, and the lower end of the end portion 188 is pivotally connected to the bifurcated inner end of the latch rod 190 by means of the pin 192. The latch rod is normally urged upwardly and rearwardly upon pivot pin 192 by means by the coil spring 194 connected at its lower end to the small eye 196 mounted on the latch rod 190 intermediate its ends and at its upper end to the upper edge of angle member 174.

The latch rod 190 has formed therein the forward notch 198 and the spaced rear notch 199 and the latch rod extends outwardly of the casing 24 through the slot 200 of the rear wall 44. A fixed latch plate 202 is secured to the rear surface of the wall 144 by means of the bolts 177, and the lower edge of the latch plate extends slightly into the slot 200 where it is engaged by the notches 198 or 199 of latch rod 190 as will be hereinafter described.

The lower handle arm portion 178 is connected at its upper end to the lower end of the upper handle arm portion 206 of the handle arm 180 which mounts the tank T as hereinafter set forth.

The first handle arm 180 formed with the lower portion 178 mounts one side of the tank T. The mount for the opposite side of the tank T includes the second handle arm 182 which includes the upper handle portion 207 and the lower portion 208 the lower end of which is fixed to the collar 210 secured to the short shaft 212 which is pivotally mounted in the arms 214 and 216 of the bracket 218′, the arms 214 and 216 connected by the bracket base portion 218. The short shaft 212 is in alignment with the stub shaft 168. The bracket base portion 218 is connected to the angle 220, and the angle 220 is in turn connected to the side wall 46 by means of bolts 222 and to the rear wall by bolts 224.

*Mechanism for adjusting front wheels*

The mechanism for adjustably raising and lowering the front ground-engaging wheels 132 and 132′ whereby the position or height of the brush B relative to the floor F is changed includes the arm 225 including the pair of spaced arms 226 and 228 rigidly secured at their inner ends to the collar 230. The collar 230 is rotatably mounted on the shaft 136, and the collar has formed therein the slot 232 through which extends the pin 234 which is secured to and extends from the shaft 136. The arms 226 and 228 have rotatably mounted on the outer ends thereof the stub shaft 236 which is formed with the threaded hole 238 extending transversely therethrough in which is engaged the inner end of the threaded adjustment rod 240. The threaded rod 240 extends through the rear wall 44 and threadedly engages the plate 242. The outer rear end of the rod 240 is provided with the turning knob 244.

The arm 225 is normally urged forwardly by means of the coil spring 246 positioned between the rear wall 44 and the washer 248 mounted on the rod 240 and abutting the arms 226 and 228. Thus as the knob 244 is threadedly rotated clockwise the arm 225 is pivoted and as it is pivoted the collar 230 rotates the shaft 136 by reason of the upper edge of the slot 232 bearing against the pin 234 which is secured to the shaft 136 as hereinbefore explained. As the shaft 136 is rotated the sleeve 144 is rotated, for the sleeve 144 is secured to shaft 36 by screw 142. Rotation of the sleeve 144 causes the arm 146 to pivot about the axis of the shaft 136, and as the arm 146 pivots upwardly with the cam wheel 150 pressing against the cam bar 90, the cam arm 80 is pivoted upwardly thus rotating shaft 74 through sleeve 78 secured to the shaft 74. As the shaft 74 is rotated so are the bracket sleeves 130 and 130' secured to the shaft 74. As a result, the wheel brackets 118 and 120 are pivoted downwardly, for the brackets are fixed to the sleeves 130 and 130' thus forcing the wheels 132 and 132' downwardly from the casing 24 thereby adjustably raising the brush B off the floor F. Reversing the above procedure by rotating the knob 244 counter-clockwise adjustably raises the wheels 132 and 132' thereby lowering the brush B to any point between a fully raised and fully lowered position. Adjustment of the brush B is highly desirable particularly where the machine A is used to clean carpet having pile of different heights.

Further provided is the reversible electric motor M mounted on the upper surface of the bottom portion forming the recess 28, and mounted on the motor shaft 250 is the toothed drive pulley 252. Positioned on the drive pulley 252 is the drive belt 254 which is also positioned on the toothed driven pulley 256 mounted on the inner end of the shaft 258 which is mounted in the bearing 260 secured to the bracket 262 mounted on the inner surface of the bottom 26. Mounted on the outer end of the shaft 258 is the pulley 264, and positioned on the pulley 264 is the toothed belt 268 which extends to and is positioned on the toothed brushed pulley 270 mounted on the outer race of bearing 272, the inner race of the bearing being mounted on the fixed shaft 274. The bearing 272 is positioned on the shaft 274 by the shoulder 275 and the retaining ring 273.

The brush pulley 270 includes the sleeve portion 276 on which is mounted the end of the cylindrical brush housing 278. The brush housing 278 is removably secured upon the sleeve portion 276 of pulley 270 for driving by means of the cap screws 280. The opposite end of the brush housing 278 is mounted on the cylindrical bearing housing 282 which is mounted on the outer race of the bearing 284, the inner race of the bearing 284 mounted on the shaft 274. Thus the brush rotates on the fixed shaft 274 by means of the bearings 272 and 284, and because of the bearing housing construction 282 the bearing 284 is mounted within the same and not outboard thereof thereby allowing the end of the brush B to lie closely adjacent the edge of the machine and not separated from the edge of the machine by a bearing and journal therefor. The end result is that the outer end of the brush B is closely adjacent the edge of the machine housing thereby allowing a brushing action closer to a wall, for example.

Further provided is the cap 286 secured to the outer end of shaft 274 by means of the screw 288, the cap 286 mounted in and extending through the end wall 34 giving access to the screw 288. Also provided is the second cap 290 secured to opposite end of the shaft 274 by means of the screw 292, the cap 290 extending through the wall 46. The cap 290 is permanently secured to wall 46. Frictionally held within the bearing housing 282 and upon the shaft 274 are the circular seal members 285 which protect the bearing 284 from foreign matter. Similarly provided is the circular seal member 287 frictionally held within the sleeve portion 276 of pulley 270 and upon the shaft 274 for protection of the bearing 272. The open lower end of the housing at wall 46 is closed off by the cover plate 46'.

Figure 12:
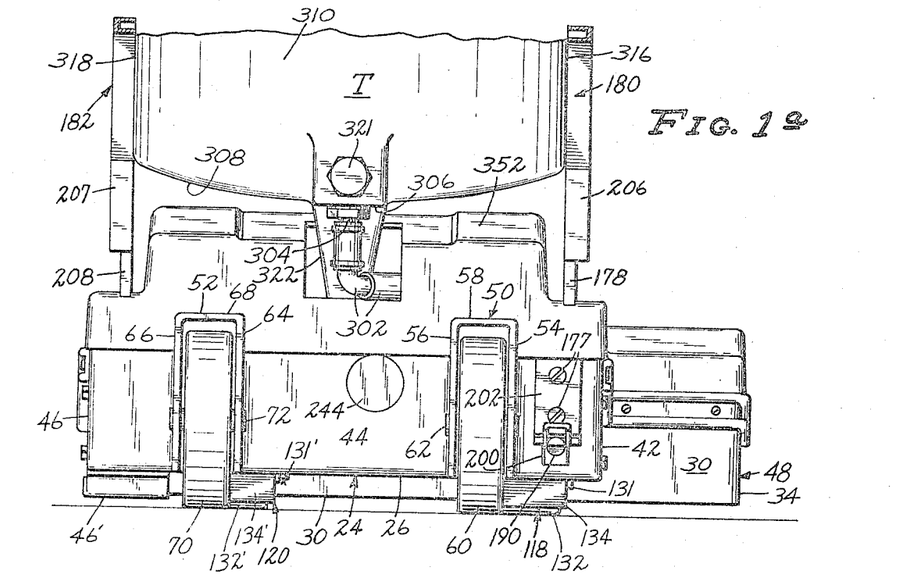
FIGURE 12 is a sectional view on the line 12—12 of FIGURE 2.

The numeral 292 designates the foam manifold tube, FIGURES 2 and 12 in particular, which has formed in the bottom of the wall thereof a multiplicity of aligned outlet holes 294 and a supply inlet tube portion 296 extending thereinto. The top 47 of the brush housing 32 has a slot 298 extending therethrough throughout the length of the top 47. The manifold tube 292 is positioned on the brush housing top 47 with the outlet holes 294 in alignment with the slot 298 by means of the clamps 300.

Connected to the inlet tube 296 is the supply tube 302, particularly FIGURE 3, which is connected at its rear end to the outlet standpipe 304 mounted on the short extension portion 306 of the bottom 308 and rear wall 310 of the tank T. The pipe 304 extends into the tank T to a point adjacent the top 314 of the tank. The tank T also includes the side walls 316 and 318 and the front wall 320. A tank drain plug 321 is provided at the rear lower end of the tank. The tank T is formed with the tank extension pocket portion 322 which extends downwardly from the bottom 308. The horizontal cross-sectional area of this pocket 322 is substantially less than the area of the bottom 308 of the tank whereby foam can be generated with a small amount of liquid with the air inlet tube 324 extending into the pocket.

The tube 324 is secured at its upper end mounted to the tank top 314 by means of the connector 326 with the lower end of the tube extended downwardly into the tank pocket 322. The lower end of the air inlet tube 324 is formed with a multiplicity of holes 328 to aid in aerating and breaking up into foam the liquid in the pocket 322. Secured to the air supply tube portion 326 is the tube portion 330 connected to the air compressor 332, and interposed in the line 330 is the one way check valve 332' and the relief valve operating at approximately 5 pounds p.s.i. The compressor 332 is mounted on the bracket 334 connected to and extending between the handle arm portions 206 and 207. The tank T is rectangular in cross section and is provided with the filler cap 336 on the top 314 of the tank, and the tank is mounted with the bottom thereof on the bracket 338 connected to and extending between the handle arm portions 206 and 207.

Figure 11:
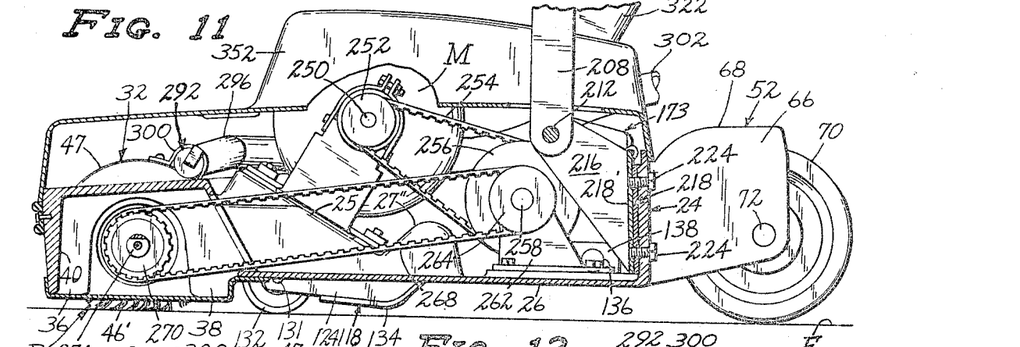
FIGURE 11 is a sectional view on the line 11—11 of FIGURE 2.
Figure 18:
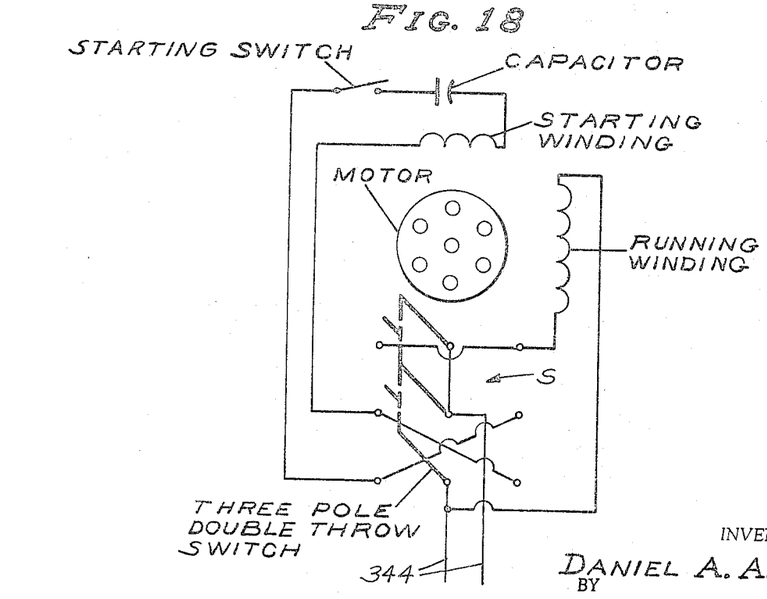
FIGURE 18 is a wiring diagram of the reversing switch and motor.

The compressor 332 is operated by an "off" and "on" toggle switch 340 mounted on the switch housing 342 connected to handle arms 180 and 182. The switch 340 is wired to the compressor 332 and the power supply line 344 by a conventional circuit. Also provided are the handle bars 346 and 348 rotatably mounted on the housing 342 secured to the handle support 343, the rotation of the handle bars actuating a conventional reversing switch S, FIGURE 18, for the motor M connected to the power line 344. The reversible motor M in one form is that made by General Electric, No. KC37PG574U. The reversing switch in one form is that made by Cutler-Hammer, No. 7617 mod., a three pole, double throw, FIGURE 18, which has an "off" position between the forward and reverse positions. When the handle bars 346 and 348 are rotated counter-clockwise or forward, the shaft 250 of motor M rotates in a counter-clockwise direction thereby rotating the brush B in a counter-clockwise direction through the above described pulleys and belts as viewed in FIGURE 11, and as a result the machine A is propelled forward when the brush B is in contact with the surface F. When the handle bars 346 and 348 are rotated in a clockwise direction, the brush B is rotated in a clockwise direction thereby causing the machine A to go backwards, the brush B simultaneously performing a cleaning action in either direction, forward or backward. Thus by changing the direction of rotation of the brush B the machine will operate and scrub a carpet at the same time. With a reversible brush, the brush not only does the cleaning but provides the forward and reverse propelling of the machine without the need for driven wheels, a transmission, reversing gears or the like. With the brush rotated in both directions, the bristles thereof are given flexing in each direction, thus preventing a permanent bend in one direction as in the case of a brush rotating in one direction. The base housing 24 is enclosed by means of the top housing 352 the lower edge of which is coterminous with the upper edge of the walls of the base housing.

Foam in the tank T is produced by pouring a concentrated liquid cleaning mixture into the tank T through filler cap 336. Water is added to the concentrated liquid substantially to the level L shown in FIGURE 3. The compressor 332 is then started, and air is forced out through the holes 326 of the air supply tube 324 thus generating foam particularly in the area above the level of the liquid where the foam is forced out the outlet pipe 304, through the foam supply tube 302 thence to the manifold tube 292, out the holes 294 thereof, through the slot 298 and onto the length of the brush B where it is carried to the surface to be cleaned by the action of the brush and the foam. As heretofore pointed out the pocket 322 allows for the very minimal of liquid into which the air tube extends whereby foam can be generated. A level of fluid does not have to be maintained on the entire bottom of the tank T.

*Operation of the brush raising and lowering mechanism*

Figure 8:
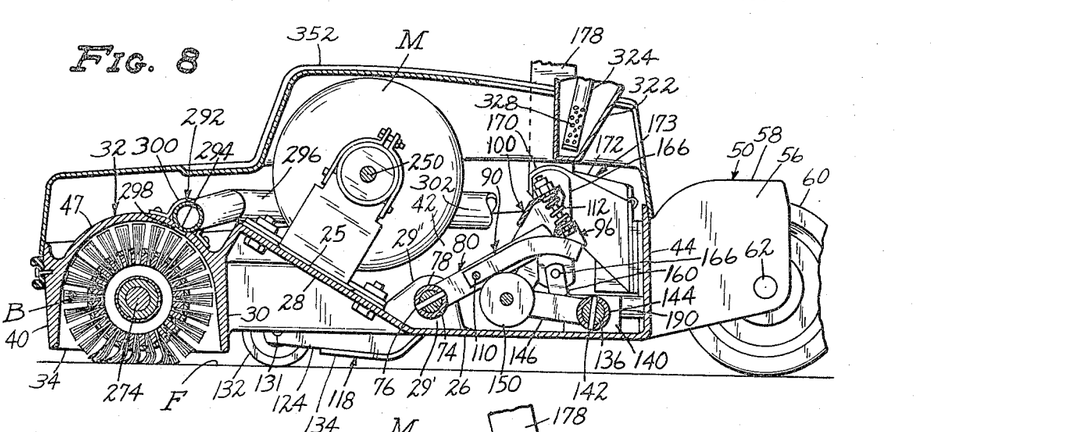
FIGURE 8 is a sectional view on the line 8—8 of FIGURE 2 with the device in a down position.
Figure 9:
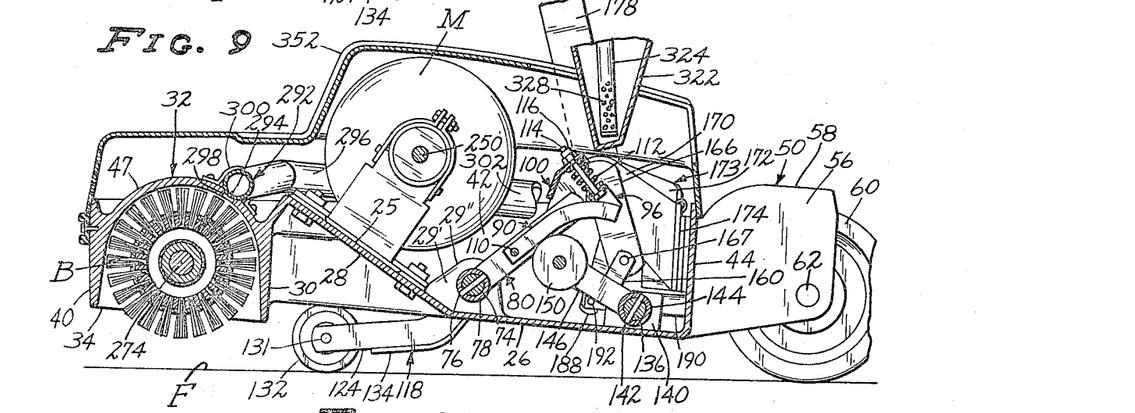
FIGURE 9 is a view similar to FIGURE 8 with the device shown in the raised position.

Let it be assumed that the machine A is in a position with the handle arms and tank in a substantially vertical position for storage with the brush thereby raised from the floor, particularly as shown in FIGURES 5, 7, and 9. In this position or condition the front notch 198 of the latch rod 190 is in engagement with the latch plate 202. This places the short end portion 183 of the handle arm portion 178 at its rearwardmost point of travel thereby placing the handle arm portions 206 and 207 and the tank T thereon in substantially a vertical position with particular reference to FIGURES 5, 7, and 9. The handle arm portion 206 pivotally follows with the arm portion 207. Again, in the position of FIGURES 5, 7, and 9 and with reference to FIGURE 9, the movement of the lower handle arm portion 188 to the position of FIGURES 5, 7, and 9 has thereby pivoted the lower end of arm 166 rearwardly by means of the stub shaft 168. As the lower end of the arm 166 moves rearwardly it pulls the pin 167 of links 160 and 162 rearwardly and slightly upwardly thereby pulling the pin 164 upwardly which in turn pivots the leg 158 of angle 154' upwardly through which the pin 164 extends. As the leg 158 is moved upwardly the short sleeve 152 is rotated, clockwise FIGURES 8 and 9, through the leg 156' of angle 154 which is connected to the sleeve 152, FIGURE 7.

As the sleeve 152 is rotated the upper edge of the slot 154 bears against the pin 156 and thereby rotates the shaft 136 clockwise thereby rotating sleeve 144, for sleeve 144 is secured to shaft 136 by pin 142. As sleeve 144 is rotated the outer end of arm 146 is pivoted upwardly, and the cam wheel 150 thereon moves upwardly against the cam bar 90 thus pivoting it up to the position of FIGURE 9 whereby the wheels 132 and 132' are pivotally moved downwardly on the shaft 74 thereby raising the entire housing and brush B from the floor F as illustrated in FIGURE 9 where it remains if the plate 202 is in engagement with the front notch 198 of latch rod 190, particularly FIGURE 7.

By pressing down on the outer end of the latch rod 190 against the action of the spring 194, the handle arm portion 178 is moved from the locked raised position of FIGURE 7 to the lowered position of FIGURES 6, 4, 8, 15.

*Operation of the mechanism for adjusting the position of the front wheels*

With the weight of the machine A upon the wheels 132 and 132', it will be seen that the cam bar 90 bears down upon the cam wheel 150, particularly FIGURES 8 and 9, and the cam wheel is connected to the shaft 136 by means of the cam 146, sleeve 144 and pin 142. Therefore if shaft 136 is rotated, it changes the relative position of the cam wheel 150 and consequently the position of the cam bar 90. To change the relative position of cam wheel and cam bar and thus raise and lower the wheels 132 and 132', the following describes such action in brief as hereinbefore set forth in detail. As the knob 244 is rotated clockwise, the arm 225 is pivoted rearwardly thereby rotating the shaft 136 by means of the upper edge of the slot 232 bearing against pin 234 at point Y, particularly FIGURE 4. As shaft 136 is rotated clockwise, as in FIGURE 4, the arm 146 is pivoted upwardly and rearwardly slightly thus forcing cam wheel 150 upwardly against and raising cam bar 90 thereby forcing wheels 132 and 132' downwardly whereby brush B is adjustably raised.

When the handle arms 180 and 182 are raised to and locked in the position of FIGURES 5, 7 and 8 (wheels down, brush up) the shaft 136 is so rotated that the pin 234 is moved clockwise in the slot 232 away from the upper edge of the slot 232. Thus the handle arms 180 and 182 may be raised to vertical position independent of the wheel adjusting mechanism due to the slot 232.

Again with reference to pin 156 in slot 154 of sleeve 152, the pin 156 is secured to shaft 136, and as the upper edge of the slot as at X, FIGURE 6, is caused to bear against the pin 156 the shaft 136 rotates slightly and sufficient to cause arm 146 to raise cam bar 90 to thereby lower wheels 132 and 132' and raise the brush. As the wheels 132 and 132' are lowered and the pressure of the upper edge of the slot 154 against pin 156 is relieved, the pin is able to move in the slot 154 slightly, thus the advantage of the slot over a fixed connection of sleeve 152 and pin 156.

As the handle arms 180 and 182 are moved from the position of FIGURE 7 (brush up) to that of FIGURE 6 (brush down) the wheels 132 and 132' return to the position determined by the position of the pin 234 and the slot 232 determined by the adjustment of the arm 225 by means of the knob 244 in the manner hereinbefore set forth. As point Y of slot 232 is moved rearwardly or clockwise in FIGURE 4 against pin 234, shaft 136 is rotated clockwise which rotates sleeve 144 and arm 146 clockwise thereby raising cam bar 90 and whereby wheels 132 and 132' are lowered.

Figure 4:
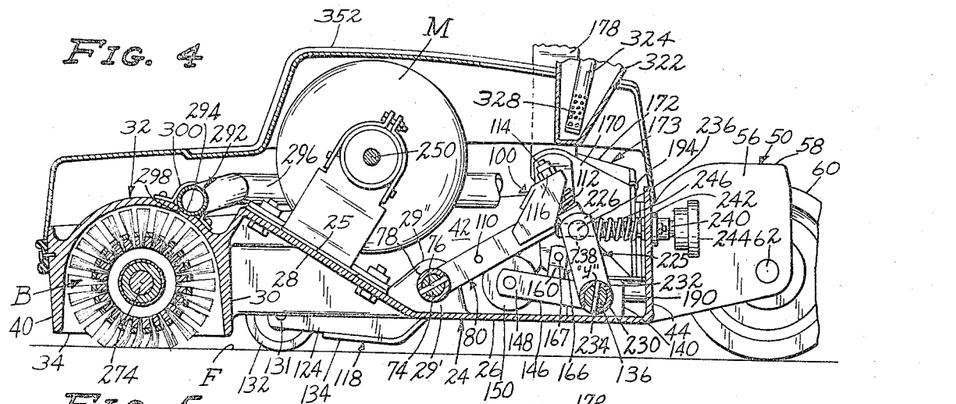
FIGURE 4 is a sectional view on the line 4—4 of FIGURE 2 with the device in the down position.

Briefly, when the handle arms 180 and 182 are in the lowered position for use of the machine, the mechanism that is connected to the arm 180 for the actuation of the wheels 132 and 132' is inoperative, for the latch rod 190 is engaged by means of the notch 199 on the plate 202 and the position of the shaft 136 which controls the position of the wheels 132 and 132' is controlled by the upper edge of the slot 232 bearing against pin 234 as at Y, FIGURES 2 and 4.

Also, briefly when the handle arms 180 and 182 are in the upright position for storage, the mechanism connected to arm 180 for the actuation of the wheels 132 and 132' is inoperative, for the latch rod 190 is engaged by means of the notch 198 on the plate 202, and the position of the shaft 136 which controls the position of the wheels 132 and 132' is controlled by the upper edge of the slot 154 bearing against pin 156 as at X, FIGURES 7 and 9 in particular. When collar 152 finally bears against pin 156, then the wheels 132 and 132' are forced down, but this doesn't occur until the last bit of travel of the handle arms to vertical, and with the handle arm 180 held vertical by the latch rod, the collar 152 holds pin 156 in the position of FIGURE 7 (wheels down, brush up). Upon release of the latch rod from the position of FIGURE 7 the collar 152 rotates slightly counter-clockwise to the position of FIGURE 6 and the wheels 132 and 132' go up and the brush down from the position of FIGURE 9 to that of FIGURE 8 due to the counter-clockwise movement of arm 146 from the position of FIGURE 9 to that of FIGURE 8.

Due to the slot 232 (no fixed connection of arm 225 and collar 230) the handle arms can go to full vertical and more with the pin 234 moving down in the slot 232 thus adjustment of arm 225 and its position is independent of the action of arm 166.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A carpet scrubbing machine comprising:
   (a) a frame housing having a bottom wall, side walls, and end walls,
   (b) a cylindrical brush rotatably mounted on said frame housing transversely thereof for engagement with the carpet,
   (c) means for rotating said brush connected to and operated by
   (d) a motor carried by said housing,
   (e) ground-engaging wheel means mounted on the rear of said housing,
   (f) front wheel mounting means pivotally mounted on said housing,
   (g) front ground engaging wheels mounted on said wheel mounting means,
   (h) a cam arm rigidly secured to said wheel mounting means substantially centrally thereof,
   (i) handle arm means pivotally mounted on said main housing for guiding the same, and
   (j) lever means connected to said handle arm means and contactable with said cam arm for causing said cam arm to pivot said wheel mounting means upon the pivotal movement of said handle arm means thereby moving said front wheels relative to said housing and to said rear wheels.

2. A carpet scrubbing machine comprising:
   (a) a frame housing having a bottom wall, side walls, and end walls,
   (b) a cylindrical brush rotatably mounted on said frame housing transversely thereof for engagement with the carpet,
   (c) means for rotating said brush connected to and operated by,
   (d) a motor carried by said housing,
   (e) ground-engaging wheel means mounted on the rear of said housing,
   (f) front wheel mounting means pivotally mounted on said housing,
   (g) front ground-engaging wheels mounted on said wheel mounting means,
   (h) a cam arm rigidly secured to said wheel mounting means substantially centrally thereof,
   (i) handle arm means pivotally mounted on said main housing for guiding the same,
   (j) lever means connected to said handle arm means and contactable with said cam arm for causing said cam arm to pivot said wheel mounting means upon the pivotal movement of said handle arm means thereby moving said front wheels relative to said housing and to said rear wheels, and
   (k) means for locking said handle arm means in preselected positions to thereby releasably fix said front wheels relative to said housing.

3. A carpet scrubbing machine comprising:
   (a) a frame housing having a bottom wall, side walls, and end walls,
   (b) a cylindrical brush rotatably mounted on said frame housing transversely thereof for engagement with the carpet,
   (c) means for rotating said brush connected to and operated by
   (d) a motor carried by said housing,
   (e) ground-engaging wheel means mounted on the rear of said housing,
   (f) front wheel mounting means pivotally mounted on said housing,
   (g) front ground-engaging wheels mounted on said wheel mounting means,
   (h) a cam arm rigidly secured to said wheel mounting means,
   (i) handle arm means pivotally mounted on said main housing for guiding the same,
   (j) lever means connected to said handle arm means and contactable with said cam arm for causing said cam arm to pivot said wheel mounting means upon the pivotal movement of said handle arm means thereby moving said front wheels relative to said housing and to said rear wheels,
   (k) means for locking said handle arm means in preselected positions to thereby releasably fix said front wheels relative to said housing.

4. A carpet scrubbing machine comprising:
   (a) a frame housing having a bottom wall, side walls, and end walls,
   (b) a cylindrical brush rotatably mounted on said frame housing transversely thereof for engagement with the carpet,
   (c) means for rotating said brush connected to and operated by
   (d) a motor carried by said housing,
   (e) ground-engaging wheel means mounted on the rear of said housing,
   (f) front wheel mounting means pivotally mounted on said housing,
   (g) front ground engaging wheels mounted on said wheel mounting means,
   (h) a cam arm rigidly secured to said wheel mounting means,
   (i) handle arm means pivotally mounted on said main housing for guiding the same,
   (j) lever means connected to said handle arm means and contactable with said cam arm for causing said cam arm to pivot said wheel mounting means upon the pivotal movement of said handle arm means thereby moving said front wheels relative to said housing and to said rear wheels,
   (k) means for causing said brush to rotate in one direction to propel the machine in one direction and simultaneously brush the carpet and in the opposite direction to propel said machine in the opposite direction and simultaneously brush the carpet.

5. A carpet scrubbing machine comprising:
   (a) a frame housing,
   (b) a cylindrical brush rotatably mounted on said frame housing for engagement with the carpet for the brushing thereof,
   (c) ground engaging wheel means mounted on said frame housing,
   (d) means for raising and lowering said wheel means,
   (e) handle arm means connected to said frame housing and said wheel raising and lowering means for changing the position of said brush relative to the carpet,
   (f) means for causing said brush to rotate in one direction to propel the machine in one direction and simultaneously brush the carpet and in the opposite direction to propel the machine in the opposite direction and simultaneously brush the carpet, and
   (g) means for adjustably positioning said wheel means independently of said wheel raising and lowering means.

6. A carpet scrubbing machine comprising:
   (a) a frame housing,
   (b) a cylindrical brush rotatably mounted on said frame housing transversely thereof for engagement with the carpet,
   (c) means for rotating said brush connected to and operated by
   (d) a motor carried by said housing,
   (e) a front wheel-mounting rocker arm pivotally mounted on said housing,
   (f) ground-engaging front wheel means mounted on the front end of said rocker arm, (g) a transverse shaft mounted for rotation on said housing,
(h) an arm connected to said transverse shaft the outer end of which engages the rear end of said rocker arm,
(i) handle arm means pivotally mounted on said housing,
(j) link means connected to said handle arm means and said transverse shaft for rotating said shaft upon the pivotal movement of said handle arm means to pivot said rocker arm and change the position of said front wheel means relative to said housing and said brush relative to the surface on which the machine rests.

7. A carpet scrubbing machine comprising:
(a) a frame housing,
(b) a cylindrical brush rotatably mounted on said frame housing transversely thereof for engagement with the carpet,
(c) means for rotating said brush connected to and operated by
(d) a motor carried by said housing,
(e) a front wheel-mounting rocker arm pivotally mounted on said housing,
(f) ground-engaging front wheel means mounted on the front end of said rocker arm,
(g) a transverse shaft mounted for rotation on said housing,
(h) an arm connected to said transverse shaft the outer end of which engages the rear end of said rocker arm,
(i) handle arm means pivotally mounted on said housing,
(j) link means connected to said handle arm means and said transverse shaft for rotating said shaft upon the pivotal movement of said handle arm means to pivot said rocker arm and change the position of said front wheel means relative to said housing and said brush relative to the surface on which the machine rests,
(k) means for adjustably rotating said transverse shaft independent of said link means to cause said arm thereof to pivot and alter the position of said rear end of said rocker arm to raise and lower the position of said front wheel means relative to said housing and said brush relative to the surface on which the machine rests.

8. A carpet scrubbing machine comprising:
(a) a frame housing,
(b) a cylindrical brush rotatably mounted on said frame housing transversely thereof for engagement with the carpet,
(c) means for rotating said brush connected to and operated by
(d) a motor carried by said housing,
(e) a front wheel-mounting rocker arm pivotally mounted on said housing
(f) ground-engaging front wheel means mounted on the front end of said rocker arm,
(g) a transverse shaft mounted for rotation on said housing,
(h) an arm connected to said transverse shaft the outer end of which engages the rear end of said rocker arm,
(i) handle arm means pivotally mounted on said housing,
(j) link means connected to said handle arm means and said transverse shaft for rotating said shaft upon the pivotal movement of said handle arm means to pivot said rocker arm and change the position of said front wheel means relative to said housing and said brush relative to the surface on which the machine rests,
(k) means for adjustably rotating said transverse shaft independent of said link means to cause said arm thereof to pivot and alter the position of said rear end of said rocker arm to raise and lower the position of said front wheel means relative to said housing and said brush relative to the surface on which the machine rests,
(l) means for locking said handle arm means and said link means inoperative relative to said transverse shaft in a position with said front wheels in a raised position relative to said housing and alternately a lowered position relative to said housing.

9. A carpet scrubbing machine comprising:
(a) a housing,
(b) a cylindrical brush rotatably mounted on said housing for engagement with a carpet,
(c) means for rotating said brush,
(d) rocker arm means pivotally mounted on said housing and extending longitudinally thereof,
(e) ground-engaging wheels mounted in the forward end of said rocker arm means,
(f) a shaft rotatably mouned in said housing,
(g) an arm fixedly secured to said shaft and engageable with the rear end portion of said rocker arm means,
(h) handle arms means pivotably mounted on said housing for guiding the housing over a surface,
(i) link means connected to said handle arm means and said shaft whereby pivoted movement of said handle arm means causes said shaft to rotate to thereby cause said arm thereof to actuate said rocker arm means and change position of said wheels relative to said housing, and
(j) means for locking said link means and handle arm means in fixed pre-selected positions to place said wheels in preselected fixed positions.

10. The device of claim 9 further characterized by:
(a) means for adjustably rotating said shaft independent of said link means to vary the position of said wheels in a preselected position.

References Cited
UNITED STATES PATENTS

| | | | |
|---|---|---|---|
| 853,525 | 5/1907 | Stewart | 15—50 |
| 1,590,671 | 6/1926 | Campbell | 15—49 |
| 1,791,812 | 2/1931 | Harrison | 15—49 |
| 2,260,207 | 10/1941 | Berg | 15—361 X |
| 2,329,563 | 9/1943 | Taylor | 15—361 |
| 2,784,433 | 3/1957 | Verhagen | 15—49 |
| 3,061,859 | 11/1962 | Dubay | 15—50 |
| 3,101,505 | 8/1963 | Belicka et al. | 15—50 X |
| 3,218,657 | 11/1965 | Jepson | 15—50 |

CHARLES A. WILLMUTH, *Primary Examiner.*

E. L. ROBERTS, *Assistant Examiner.*